(12) United States Patent
Yang

(10) Patent No.: US 10,798,258 B2
(45) Date of Patent: *Oct. 6, 2020

(54) INFORMATION PROCESSING METHOD, INFORMATION PROCESSING APPARATUS, AND NON-TRANSITORY RECORDING MEDIUM STORING INSTRUCTIONS FOR EXECUTING AN INFORMATION PROCESSING METHOD

(71) Applicant: Fei Yang, Tokyo (JP)

(72) Inventor: Fei Yang, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/707,650

(22) Filed: Dec. 9, 2019

(65) Prior Publication Data

US 2020/0112645 A1 Apr. 9, 2020

Related U.S. Application Data

(63) Continuation of application No. 16/217,196, filed on Dec. 12, 2018, now Pat. No. 10,530,940.

(30) Foreign Application Priority Data

Jan. 18, 2018 (JP) .................................. 2018-006754

(51) Int. Cl.
*G06K 15/00* (2006.01)
*H04N 1/00* (2006.01)
(Continued)

(52) U.S. Cl.
CPC ..... *H04N 1/00344* (2013.01); *G06K 9/00671* (2013.01); *G06K 9/6215* (2013.01);
(Continued)

(58) Field of Classification Search
CPC ........... H04N 1/00344; H04N 1/00244; H04N 1/0049; H04N 2201/0094;
(Continued)

(56) References Cited

U.S. PATENT DOCUMENTS

| | | | |
|---|---|---|---|
| 2013/0114100 A1* | 5/2013 | Torii | G06F 11/0733 358/1.14 |
| 2017/0187897 A1* | 6/2017 | Shin | G06F 3/1292 |
| 2018/0227251 A1 | 8/2018 | Takishima et al. | |

FOREIGN PATENT DOCUMENTS

| | | |
|---|---|---|
| JP | 2013-117938 A | 6/2013 |
| JP | 2016-103270 A | 6/2016 |
| JP | 2018-128843 A | 8/2018 |

* cited by examiner

*Primary Examiner* — Moustapha Diaby
(74) *Attorney, Agent, or Firm* — Harness, Dickey & Pierce, P.L.C.

(57) ABSTRACT

An information processing method, apparatus, and non-transitory recording medium storing instructions for executing an information processing method. The information processing method, performed by a computer connectable to a terminal via a network, includes determining a status of a device based on a first image of the device transmitted from the terminal, specifying a solution for a problem occurring in the device based on the status of the device, displaying a first message on the terminal to indicate the specified solution, displaying a second message on the terminal to request a second image obtained by photographing a specified part of the device or the device in a specified state, updating the status of the device based on the second image, specifying the solution for the problem in accordance with the updated status of the device, and displaying a third message on the terminal to indicate the specified solution for the problem.

15 Claims, 12 Drawing Sheets

(51) Int. Cl.
   *H04L 12/58*        (2006.01)
   *G06K 9/62*         (2006.01)
   *G06K 9/00*         (2006.01)

(52) U.S. Cl.
   CPC ........... *H04L 51/02* (2013.01); *H04N 1/0049* (2013.01); *H04N 1/00244* (2013.01); *G06K 2209/01* (2013.01); *H04N 2201/0094* (2013.01)

(58) Field of Classification Search
   CPC ............ H04N 2201/0096; H04L 51/02; G06K 9/00671; G06K 9/6215; G06K 2209/01
   See application file for complete search history.

FIG. 5

| KEYWORD | INITIAL STATUS |
|---|---|
| PAPER, MISFEED | S1-1 (PAPER MISFEED) |
| TONER, OUT | S2-1 (OUT OF TONER) |
| PAPER, OUT | S3-1 (OUT OF PAPER) |
| ⋮ | ⋮ |

| INITIAL STATUS | RECOMMENDED SOLUTION MESSAGE | REQUESTED ACTION MESSAGE |
|---|---|---|
| S1-1 (PAPER MISFEED) | The paper seems to be misfed. Please open the side cover and remove the misfed paper. | Please send a photograph of the MFP with the side cover open. |
| S1-2 (MISFED PAPER REMAINING) | Please remove the misfed paper while pressing the release switch. | Please send a photograph of the MFP with the side cover open. |
| S1-3 (COVER OPEN) | ... | ... |
| ... | ... | ... |

400

INFORMATION PROCESSING METHOD, INFORMATION PROCESSING APPARATUS, AND NON-TRANSITORY RECORDING MEDIUM STORING INSTRUCTIONS FOR EXECUTING AN INFORMATION PROCESSING METHOD

CROSS-REFERENCE TO RELATED APPLICATIONS

This patent application is a Continuation of U.S. application Ser. No. 16/217,196, filed on Dec. 12, 2018, which claims priority pursuant to 35 U.S.C. § 119(a) to Japanese Patent Application No. 2018-006754, filed on Jan. 18, 2018 in the Japan Patent Office, the entire disclosure of which is hereby incorporated by reference herein.

BACKGROUND

Technical Field

The present disclosure relates to an information processing method, an information processing apparatus, and a non-transitory recording medium storing instructions for executing an information processing method.

Background Art

In recent years, the number of users taking advantage of instant messaging services with mobile terminal devices such as smartphones is increasing. In the instant messaging services and the like, various software robot services may be provided. With such a software robot service, for example, by adding a software robot (hereinafter also referred to as a "bot") presenting certain information as a friend and chatting with this friend (bot), the user can receive presentation of certain information.

SUMMARY

Embodiments of the present disclosure described herein provide an information processing method, apparatus, and non-transitory recording medium storing instructions for executing an information processing method. The information processing method, performed by a computer connectable to a terminal via a network, includes determining a status of a device based on a first image of the device transmitted from the terminal, specifying a solution for a problem occurring in the device based on the status of the device, displaying a first message on the terminal to indicate the specified solution, displaying a second message on the terminal to request a second image obtained by photographing a specified part of the device or the device in a specified state, updating the status of the device based on the second image, specifying the solution for the problem in accordance with the updated status of the device when the status is updated based on the second image, and displaying a third message on the terminal to indicate the specified solution for the problem.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 5 illustrates an example of an initial status definition table;

FIG. 6 illustrates an example of a message definition table;

Figure 1:
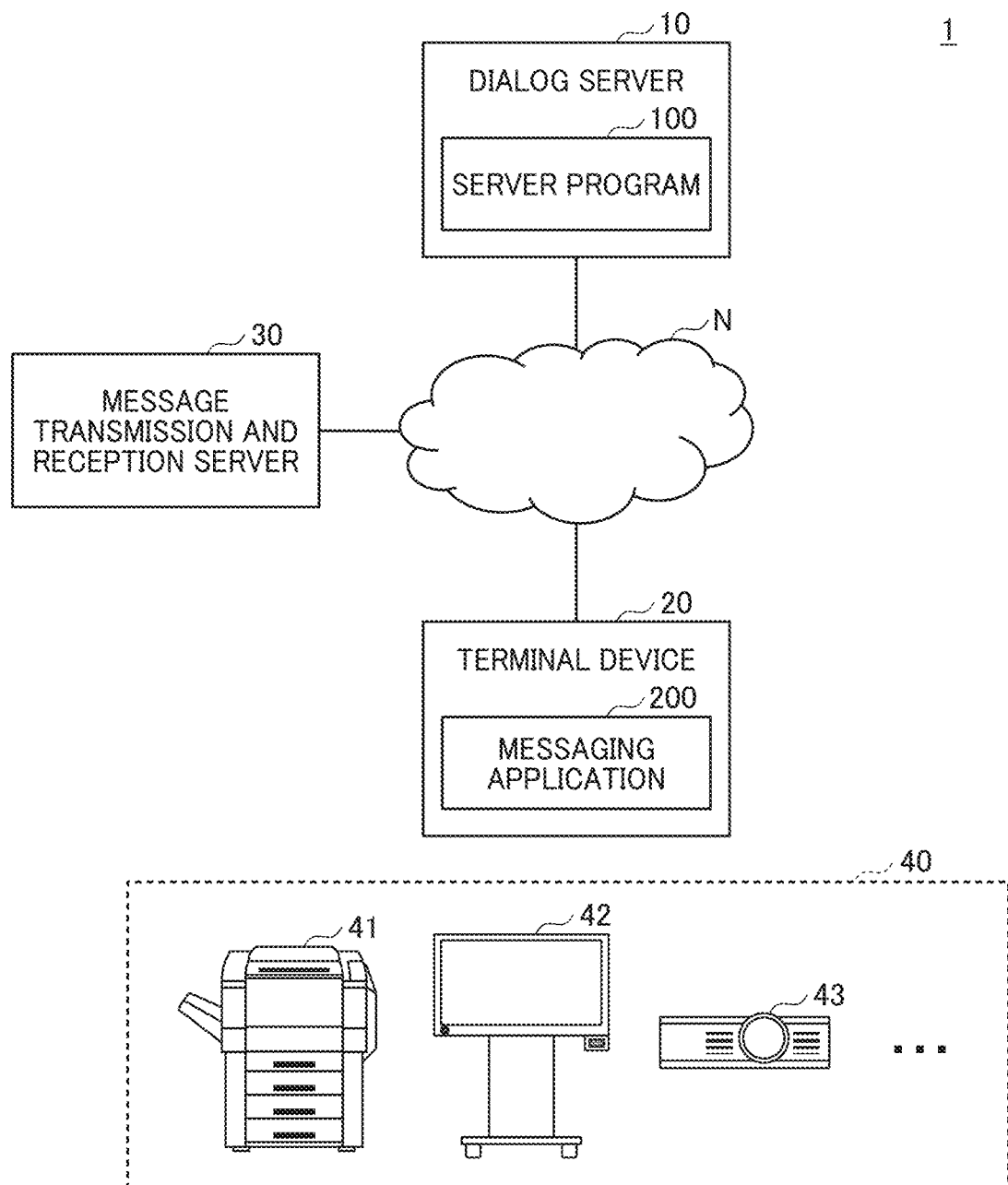
FIG. 1 is a schematic diagram illustrating an overall configuration of a dialog system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a description is given of an embodiment of the present disclosure with reference to the drawings.

Overview of Configuration

A dialog system 1 according to the present embodiment includes a dialog server 10 to provide a bot service, a terminal device 20 belonging to a user who uses the bot service, a message transmission and reception server 30 to provide an instant messaging service. The dialog server 10, the terminal device 20, and the message transmission and reception server 30 are communicably connected via a network N including, for example, the internet, a telephone network, a mobile communication network, and the like.

The dialog server 10 is an information processing apparatus (computer) or an information processing system (computer system) that provides the bot service using the instant messaging service. The dialog server 10 according to the present embodiment provides the bot service for presenting a countermeasure or a solution to a problem such as a failure occurring in various devices 40 such as a multifunction peripheral (MFP) 41, an interactive whiteboard (IWB) 42, and a projector 43. Hereafter, a description is given using the term "solution".

A server program 100 is installed in the dialog server 10. The dialog server 10 can provide the bot service for presenting the solution to the failure or the like occurring in the device 40 by the server program 100. In this bot service, for example, by receiving an image of the device 40 in which the failure or the like has occurred, the status of the device 40 is specified and the solution according to the specified status is presented. In this manner, in the bot service provided by the dialog server 10 according to the present embodiment, the status of the device 40 is specified from the image obtained by photographing the device 40, and the solution according to the specified status is presented. Note that the status is a state of the device 40 specified by the image of at least a part of the device 40.

The terminal device 20 is a smartphone, a tablet terminal, a personal computer (PC), and the like operated by the user using the bot service. In the terminal device 20, a messaging application 200 for using the instant messaging service is installed. With the instant messaging service using the messaging application 200, the user of the terminal device 20 can transmit and receive messages, images, and the like with other users or the bots. Note that the user of the terminal device 20 may be able to transmit and receive electronic files such as voice, moving image, document data, etc. with other users or the bots using the messaging application 200.

By adding the bot as a friend using the messaging application 200, for example, the user of the terminal device 20 can transmit and receive messages, images, and the like to and from the bot, and use the bot service provided by the dialog server 10.

For example, when the failure or the like occurs in the device 40, the user of the terminal device 20 can receive the solution for the failure or the like of the device 40 by transmitting the image obtained by photographing the device 40 to the bot using the messaging application 200.

Examples of the messaging application 200 include LINE (trademark or registered trademark), Slack (trademark or registered trademark), Skype (trademark or registered trademark), ChatWork (trademark or registered trademark), Facebook Messenger (trademark or registered trademark), WhatsApp (trademark or registered trademark), cacao talk (trademark or registered trademark), and the like.

The message transmission and reception server 30 is the information processing apparatus (computer) or the information processing system (computer system) configured to provide the instant messaging service. Transmission and reception of messages and the like using the instant messaging service between the dialog server 10 and the terminal device 20 is performed via the message transmission and reception server 30. That is, transmission and reception of messages, images and the like between the user of the terminal device 20 and the bot of the bot service are performed via the message transmission and reception server 30.

In FIG. 1, the dialog server 10 and the message transmission and reception server 30 are illustrated as different devices or systems, but the dialog server 10 and the message transmission and reception server 30 can be the same device or system. In other words, a service provider that provides the instant messaging service and the service provider that provides the bot service may be the same business entity or entities that can be regarded as the same entity.

Further, the device 40 is not limited to an MFP, electronic whiteboard, projector, or the like. Alternatively, the device 40 may be any of various electronic devices such as a copier, a scanner, a facsimile, a video conference terminal, a digital signage device, a PC, a household electrical appliance, a game device, a digital camera, or the like.

Hardware Configuration

A description is given of the hardware configuration of the dialog server 10 and the terminal device 20 included in the dialog system 1 according to the present embodiment.

Figure 2:
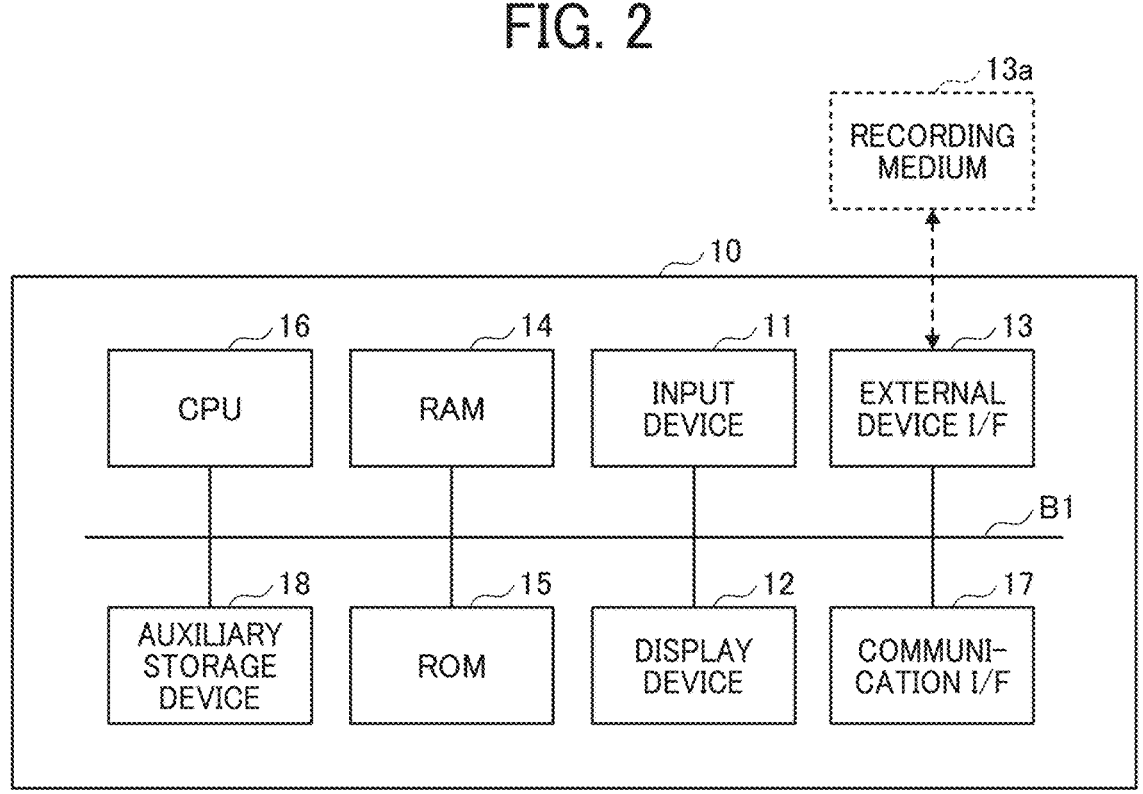
FIG. 2 is a block diagram illustrating a hardware configuration of a dialog server according to an embodiment of the present disclosure.

FIG. 2 is a block diagram illustrating an example of the hardware configuration of the dialog server 10 according to the present embodiment.

As illustrated in FIG. 2, the dialog server 10 according to the present embodiment includes an input device 11, a display device 12, an external device interface (I/F) 13, and a random-access memory (RAM) 14. Further, the dialog server 10 according to the present embodiment includes a read only memory (ROM) 15, a central processing unit (CPU) 16, a communication I/F 17, and an auxiliary storage device 18. These hardware devices are connected to one another via a bus B1.

The input device 11 includes a keyboard, a mouse, a touch panel, and the like, and is used by the user to input various operations. The display device 12 includes a display and the like and displays the processing result by the dialog server 10. The dialog server 10 may not include at least one of the input device 11 and the display device 12.

The external device I/F 13 is an interface that connects the dialog server 10 with an external device. Examples of the external device include a recording medium 13a. The dialog server 10 can read and write the recording medium 13a via the external device I/F 13. Examples of the recording medium 13a include a flexible disc, a compact disc (CD), a digital versatile disc (DVD), a secure digital (SD) memory card, and a universal serial bus (USB) memory.

The RAM 14 is a volatile semiconductor memory that temporarily stores programs and/or data. The ROM 15 is a nonvolatile semiconductor memory that holds programs and/or data even after the dialog server 10 is turned off and the power is not supplied. The ROM 15 stores programs and/or data such as a basic input output system (BIOS) which is executed when the dialog server 10 is started up, operating system (OS) settings, and network settings.

The CPU 16 reads programs or data from a storage device such as the ROM 15 and the auxiliary storage device 18 onto the RAM 14 and executes processing to implement the entire control of the dialog server 10 or functions of the dialog server 10.

The communication I/F 17 is the interface for connecting the dialog server 10 to the network N. The dialog server 10 can perform data communication with another apparatus or the like via the communication I/F 17.

The auxiliary storage device 18 is, for example, a hard disk drive (HDD), a solid-state drive (SSD) or the like and is a nonvolatile storage device that stores programs and data. Programs and data stored in the auxiliary storage device 18 include the OS which is basic software for controlling the entire dialog server 10, software which provides various functions on the OS, the server program 100, and the like. The auxiliary storage device 18 manages stored programs and data by a predetermined file system, database (DB), or the like.

Figure 3:
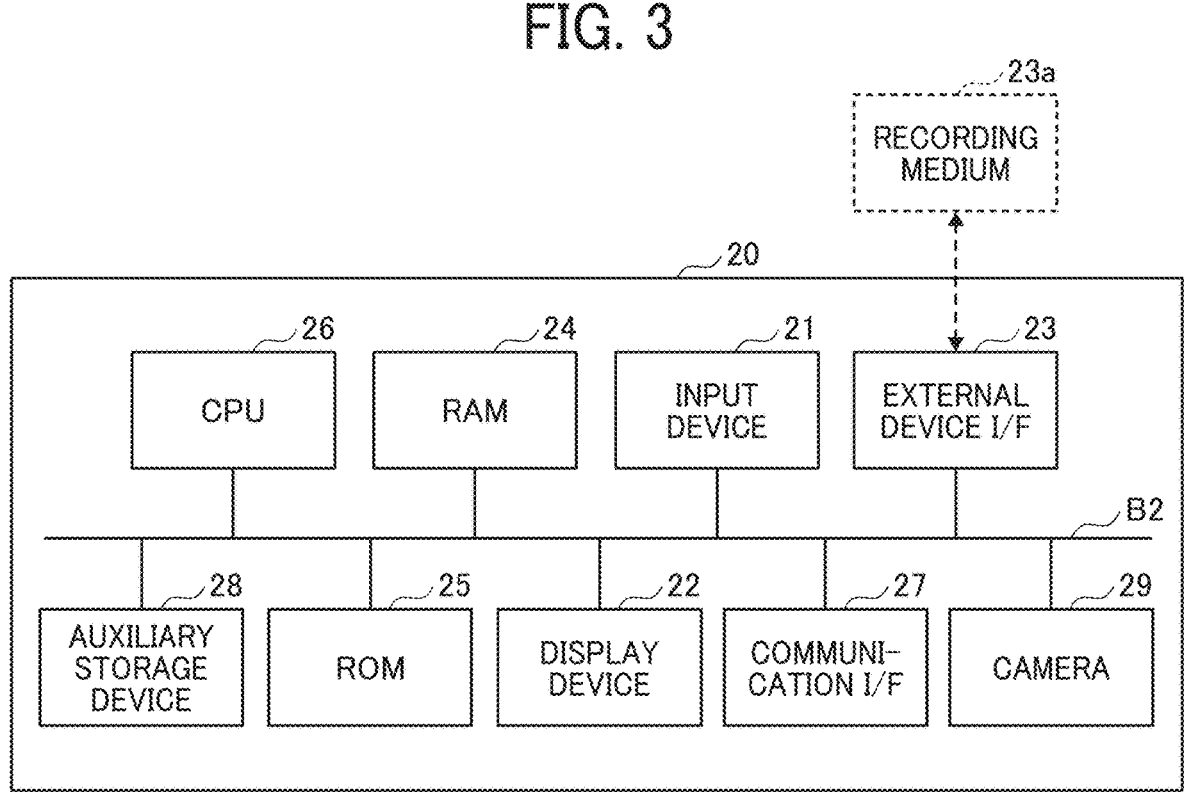
FIG. 3 is a block diagram illustrating a hardware configuration of a terminal device according to an embodiment of the present disclosure.

The dialog server 10 according to the present embodiment implements processes as described later with the hardware configuration as illustrated in FIG. 3.

FIG. 3 is a block diagram illustrating an example of the hardware configuration of the terminal device 20 according to the present embodiment.

As illustrated in FIG. 3, the terminal device 20 according to the present embodiment includes an input device 21, a display device 22, an external device I/F 23, a RAM 24, a ROM 25, a CPU 26, a communication I/F 27, an auxiliary storage device 28, and a camera 29. These hardware devices are connected to one another via a bus B2.

The input device 21 is, for example, a touch panel or the like, and is used by the user to input various operations. The display device 22 is, for example, a display or the like, and displays the processing result by the terminal device 20. When the input device 21 is the touch panel, the input device 21 and the display device 22 are configured as a single unit.

The external device I/F 23 is an interface that connects the terminal device 20 to an external device. As an example of the external device, a recording medium 23a is used here. The terminal device 20 can read and write the recording medium 23a via the external device I/F 23. The recording medium 23a includes, for example, the SD memory card, the USB memory, and the like.

The RAM 24 is the volatile semiconductor memory that temporarily holds programs and data. The ROM 25 is the nonvolatile semiconductor memory which holds programs or data even after the terminal device 20 is turned off and the power is not supplied. The ROM 25 stores programs and data such as BIOS, OS settings, network settings, and the like, which are executed at the time of activation of the terminal device 20.

The CPU 16 reads programs or data from a storage device such as the ROM 25 and the auxiliary storage device 28 onto the RAM 24 and executes processing to implement the entire control of the terminal device 20 or functions of the terminal device 20.

The communication I/F 27 is the interface for connecting the terminal device 20 to the network N. The terminal device 20 can perform data communication with another device or the like via the communication I/F 27.

The auxiliary storage device 28 is the nonvolatile semiconductor memory that stores programs and data. Programs and data stored in the auxiliary storage device 28 include the OS which is basic software for controlling the entire terminal device 20, software which provides various functions on the OS, the messaging application 200, and the like. The camera 29 is an imaging device to generate image data by photographing a subject to be photographed.

The terminal device 20 according to the present embodiment implements processes as described later with the hardware configuration as illustrated in FIG. 3.

Functional Configuration

Figure 4:
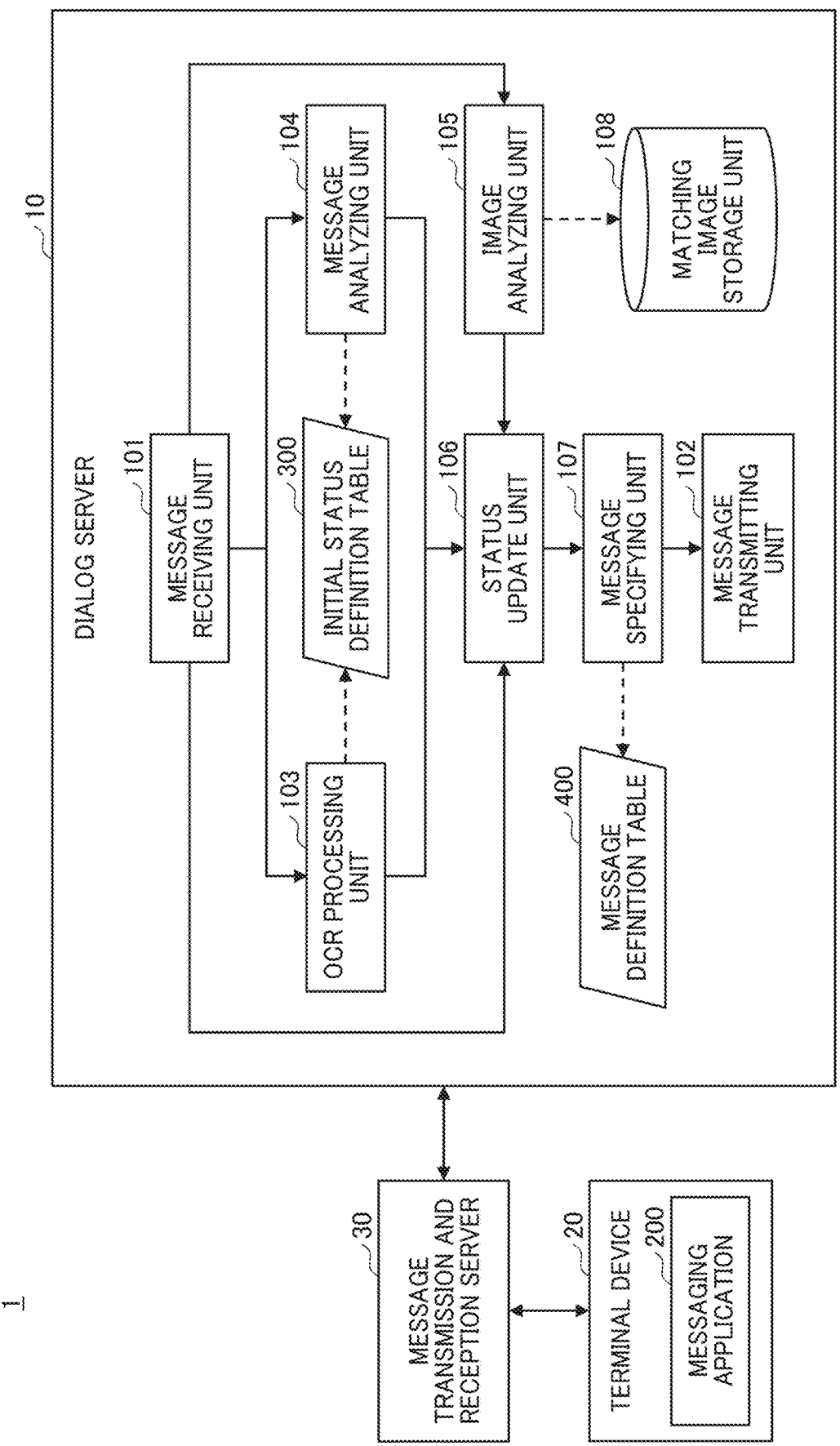
FIG. 4 is a block diagram illustrating a functional configuration of the dialog system according to an embodiment of the present disclosure.

FIG. 4 is a block diagram illustrating an example of the functional configuration of the dialog system 1 according to the present embodiment.

As illustrated in FIG. 4, the dialog server 10 according to the present embodiment includes a message receiving unit 101, a message transmitting unit 102, an optical character recognition (OCR) processing unit 103, a message analyzing unit 104, an image analyzing unit 105, a status update unit 106 and a message specifying unit 107. These functional units are implemented by the processing executed by the CPU 16 based on the server program 100.

Further, the dialog server 10 according to the present embodiment includes a matching image storage unit 108. The matching image storage unit 108 may be implemented by using the auxiliary storage device 18, for example. Additionally, the matching image storage unit 108 may be implemented by using, for example, a storage device or the like connected to the dialog server 10 via the network N.

The message receiving unit 101 receives message, image, and the like transmitted from the messaging application 200 of the terminal device 20 via the message transmission and reception server 30.

The message transmitting unit 102 transmits the message to the messaging application 200 of the terminal device 20 via the message transmission and reception server 30.

When the status of the device 40 is not specified and the message receiving unit 101 receives an image, the OCR processing unit 103 performs OCR processing on the image and extracts character information. Then, the OCR processing unit 103 refers to an initial status definition table 300 and determines the status (initial status) of the device 40 from the extracted character information. The initial status definition table 300 is a table for specifying the initial status of the device 40. Details of the initial status definition table 300 are described later.

Similarly, when the status of the device 40 is not specified and the message receiving unit 101 receives a message, the message analyzing unit 104 analyzes the message and extracts character information representing the failure or the like occurring in the device 40. Then, the message analyzing unit 104 refers to the initial status definition table 300 and determines the status (initial status) of the device 40 from the extracted character information.

Conversely, when the status of the device 40 is specified and when the message receiving unit 101 receives the image of the device 40, the image analyzing unit 105 compares the image with the image stored in the matching image storage unit 108 (hereinafter, this image is referred to as a "matching image") and specifies the updated status of the device 40.

In the matching image storage unit 108, the matching image obtained from the images of the device 40 photographed in advance and the status of the device 40 are stored in association with each other. For example, the matching image obtained by photographing a certain part of the device 40 (or the device 40 in a certain state) at the time of occurrence of a certain failure and the status of the device 40 (status indicating that the failure has occurred) are stored in association with each other. Similarly, for example, the matching image obtained by photographing another part of the device 40 (or the device 40 in another state) at the time of occurrence of another failure and the status of the device 40 indicating that another failure has occurred are stored in association with each other. More specifically, for example, the matching image obtained by photographing the device 40 with the paper misfeed and the side cover open and the status of the device 40 (for example, the status indicating that the paper misfeed has occurred) are stored in association with each other. Further, for example, the matching image obtained by photographing the device 40 with the toner exhausted and the front cover open and the status (for example, the status indicating that toner has run out) of the device 40 are stored in association with each other.

In the matching image storage unit 108, a plurality of matching images, for example, thousands to tens of thousands matching images are stored in association with the respective status of the device 40.

The image analyzing unit 105 performs pattern matching between the image and the matching image stored in the matching image storage unit 108 and calculates similarity. Then, the image analyzing unit 105 determines the status associated with the matching image having the highest degree of similarity (that is, the matching image most similar to the image received) as the updated status of the relevant device 40.

When the status (initial status) is specified by the OCR processing unit 103 or the message analyzing unit 104, the status update unit 106 determines the initial status as the status of the device 40.

Further, when the updated status is specified by the image analyzing unit 105, the status update unit 106 updates the status of the device 40 with the updated status.

The message specifying unit 107 specifies a message to be presented to the user from the status of the device 40 based on a message definition table 400. The message definition table 400 is a table for specifying the message to be presented to the user based on the status of the device 40. Details of the message definition table 400 are described later.

A detailed description is given below of the initial status definition table 300 with reference to FIG. 5. The initial status definition table 300 is stored in, for example, the auxiliary storage device 18.

As illustrated in FIG. 5, the initial status definition table 300 includes "keyword" and "initial status" as data items.

In the first example mentioned in FIG. 5, the keywords "paper" and "misfeed" are associated with the initial status "S1-1 (paper misfeed)". The first example mentioned in FIG. 5 indicates that when the character information extracted by the OCR processing unit 103 or the message analyzing unit 104 includes "paper" and "misfeed", the initial status of the device 40 is specified as "S1-1 (paper misfeed)".

Similarly, in the second example mentioned in FIG. 5, the keywords "toner" and "out" are associated with the initial status "S2-1 (out of toner)". The second example mentioned in FIG. 5 indicates that when the character information extracted by the OCR processing unit 103 or the message analyzing unit 104 includes "toner" and "out", the initial status of the device 40 is specified as "S2-1 (out of toner)".

Similarly, in the third example mentioned in FIG. 5, the keywords "paper" and "out" are associated with the initial status "S3-1 (out of paper)". The third example mentioned in FIG. 5 indicates that when the character information extracted by the OCR processing unit 103 or the message analyzing unit 104 includes "paper" and "out", the initial status of the device 40 is specified as "S3-1 (out of paper)".

As described above, in the initial status definition table 300, information for specifying the initial status from the character information extracted by the OCR processing unit 103 or the message analyzing unit 104 is stored.

Further, details of the message definition table 400 are described with reference to FIG. 6. The message definition table 400 is stored, for example, in the auxiliary storage device 18.

As illustrated in FIG. 6, the message definition table 400 includes "initial status", "recommended solution message", and "requested action message" as data items. The recommended solution message indicates the solution for the failure or the like corresponding to the initial status of the device 40. The requested action message indicates a request to the user to send the image necessary for specifying the updated status when the failure or the like of the device 40 cannot be resolved by the solution in the recommended solution message.

In the first example mentioned in FIG. 6, the initial status "S1-1 (paper misfeed)" is associated with the recommended solution message "The paper seems to be misfed. Please open the side cover and remove the misfed paper". The first example mentioned in FIG. 6 indicates that when the initial status of the device 40 is "S1-1 (paper misfeed)", the recommended solution message "The paper seems to be misfed. Please open the side cover and remove the misfed paper." is presented to the user.

Also, in the first example mentioned in FIG. 6, initial status "S1-1 (paper misfeed)" is associated with the requested action message "Please send a photograph of the MFP with the side cover open". The first example mentioned in FIG. 6 indicates that when the user fails to solve the problem by presenting the message "The paper seems to be misfed. Please open the side cover and remove the misfed paper.", the requested action message "Please send a photograph of the MFP with the side cover open." is presented to the user.

Likewise, in the second example mentioned in FIG. 6, the recommended solution message "Please remove the misfed paper while pressing the release switch." is associated with the initial status "S1-2 (misfed paper remaining)". The second example mentioned in FIG. 6 indicates that when the initial status of the device 40 is "S1-2 (misfed paper remaining)", the recommended solution message "Please remove the misfed paper while pressing the release switch." is presented to the user.

Also, in the second example mentioned in FIG. 6, initial status "S1-2 (misfed paper remaining)" is associated with the requested action message "Please send a photograph of the MFP with the side cover open". The second example mentioned in FIG. 6 indicates that when the user fails to solve the problem by presenting the message "Please remove the misfed paper while pressing the release switch", the requested action message "Please send a photograph of the MFP with the side cover open." is presented to the user.

As described above, the message definition table 400 stores the recommended solution message indicating the solution to the failure and the like of the device 40 in the certain status and the requested action message requesting the user to send the photograph when the user fails to solve the failure by the solution presented by the recommended solution message.

Details of Processing

Figure 7A:
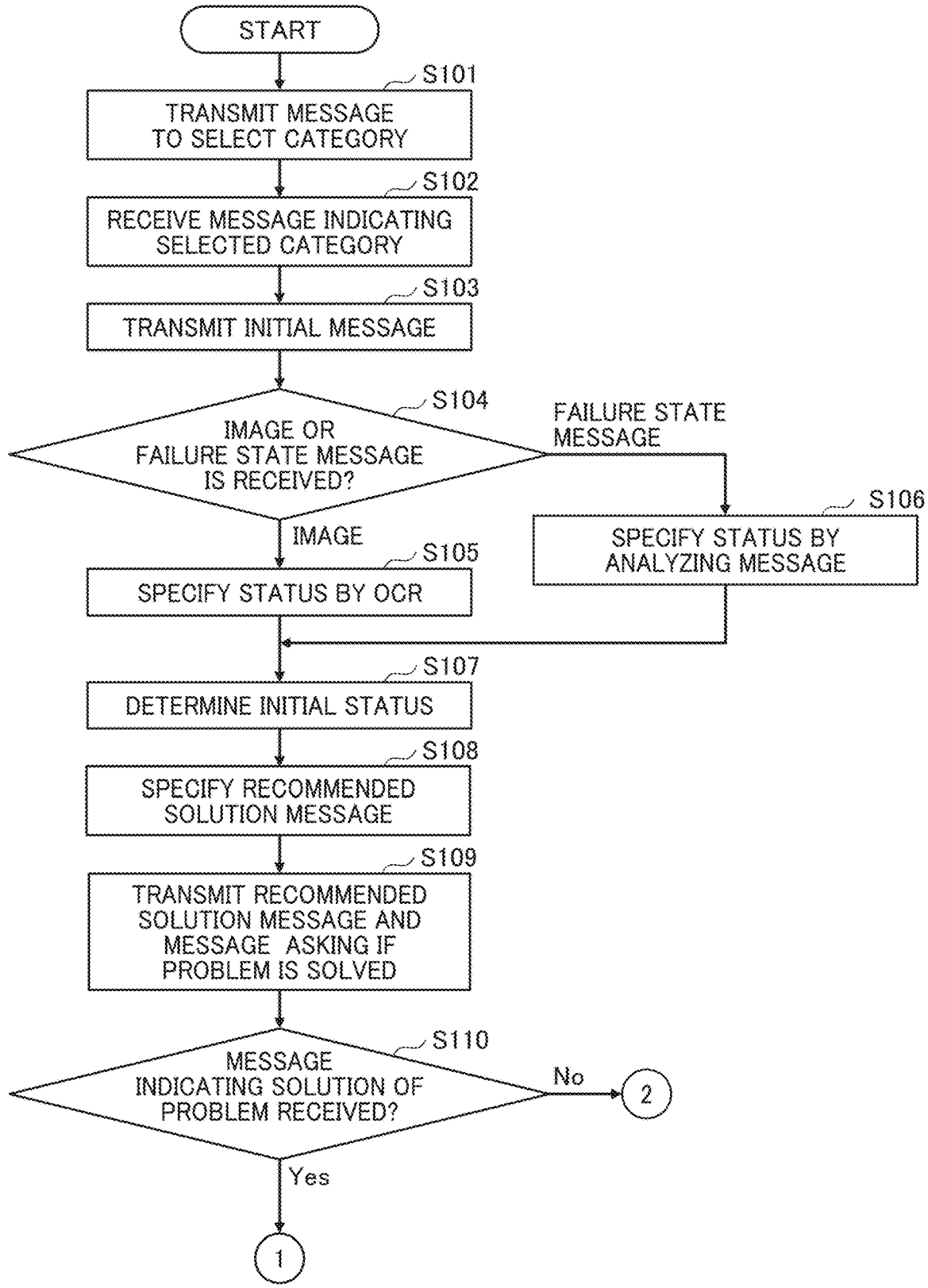
FIGS. 7A and FIG. 7B are a flowchart illustrating an example of dialog processing executed by the dialog server according to an embodiment of the present disclosure.
Figure 7B:
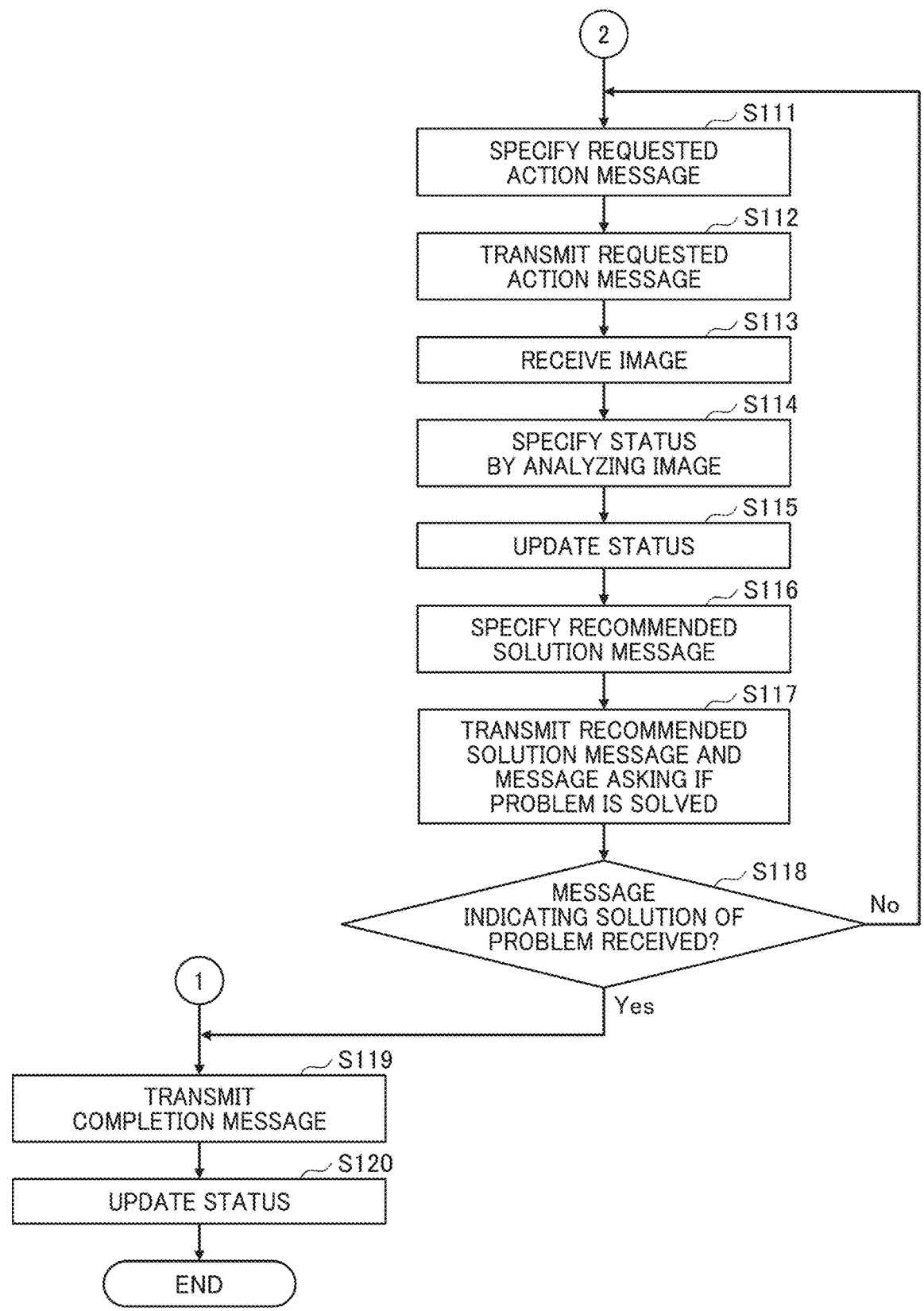

With reference to FIG. 7A and FIG. 7B, a description is given of the dialog processing for presenting the solution to the failure or the like occurring in the device 40 to the user of the terminal device 20, by the dialog server 10 included in the dialog system 1 according to the present embodiment. FIG. 7A and FIG. 7B are a flowchart illustrating an example of dialog processing executed by the dialog server 10 according to the present embodiment. The user of the terminal device 20 is assumed to start using the bot service with the messaging application 200. In order to start using the bot service, the user of the terminal device 20 needs to add the bot as a friend (or add the bot to a contact list, etc.), for example, using the messaging application 200.

Further, transmission and reception of various data (transmission and reception of the message, transmission and reception of the image, etc.) between the dialog server 10 and the terminal device 20 is performed via the message transmission and reception server 30, but hereinafter, "through the message transmission and reception server 30" is omitted from the description.

Figure 8:
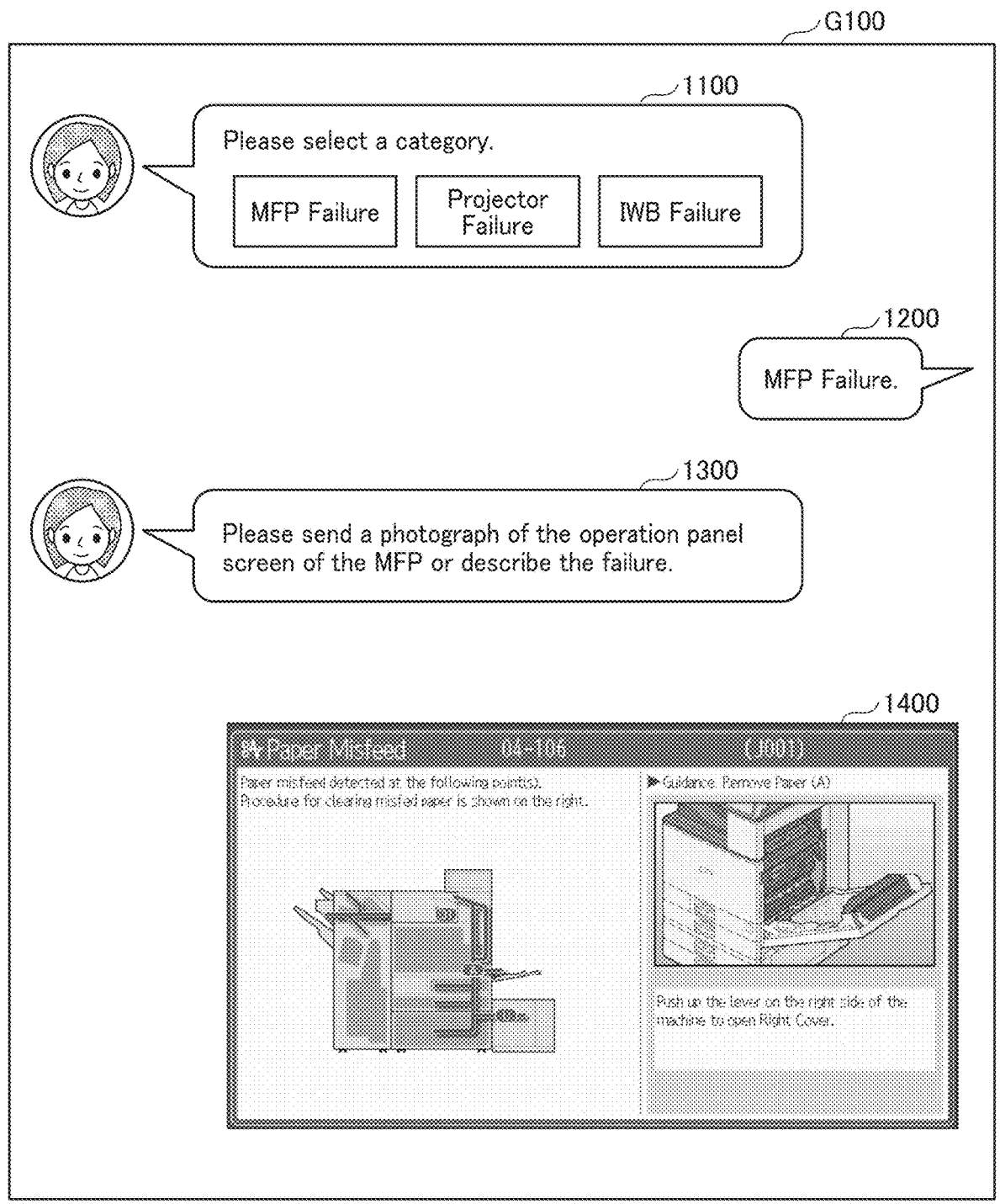
FIG. 8 is a diagram illustrating a first example of a dialog screen.

In step S101, the message transmitting unit 102 transmits a message for the user to select a category to the terminal device 20. The message for the user to select the category is, for example, the message to request the user to select the type of the device 40 in which the failure or the like has occurred. As a result, a category selection message 1100 is displayed on a dialog screen G100 by the messaging application 200 as illustrated in FIG. 8. In the category selection message 1100, options "MFP failure", "projector failure" and "IWB failure" for selecting the type of the device 40 in which the failure or the like has occurred are displayed.

When the user inputs, for example, "MFP failure" using the messaging application 200 of the terminal device 20 and performs a transmission operation, the messaging application 200 transmits a message (message indicating selected category) "MFP failure" to the dialog server 10. Accordingly, a message 1200 indicating the selected category is displayed on the dialog screen G100 displayed by the messaging application 200 of the terminal device 20.

In step S102, the message receiving unit 101 of the dialog server 10 receives the message indicating the selected category.

In step S103, the message transmitting unit 102 of the dialog server 10 transmits an initial message when the message receiving unit 101 receives the message indicating the selected category. The initial message is, for example, a message for prompting the user to transmit or input information for specifying the initial status.

When the terminal device 20 receives the initial message, an initial message 1300 is displayed on the dialog screen G100 by the messaging application 200. As an example of the initial message 1300, a message such as "Please send a photograph of the operation panel screen of the MFP or describe the failure." is displayed.

Using the messaging application 200 of the terminal device 20, the user can send a photograph (image) taken of the operation panel screen of the MFP (device 40) or describe the failure.

When the user sends the photograph (image) of the operation panel screen of the MFP (device 40) using the messaging application 200 of the terminal device 20, the messaging application 200 transmits the image to the dialog server 10. As a result, an image 1400 transmitted to the dialog server 10 is displayed on the dialog screen G100 by the messaging application 200 of the terminal device 20.

For example, an image generated by photographing the device 40 using the camera 29 included in the terminal device 20 may be transmitted to the dialog server 10, or the device 40 may be photographed using another camera and the photograph may be transmitted to the dialog server 10.

On the other hand, when the user inputs and communicates using the messaging application 200 of the terminal device 20, the messaging application 200 transmits a message (failure state message) indicating the failure state to the dialog server 10. When the user communicates using the messaging application 200 of the terminal device 20, a failure state message is displayed on the dialog screen G100 by the messaging application 200 of the terminal device 20.

In step S104, the message receiving unit 101 of the dialog server 10 determines whether the image or the failure state message is received.

When the message receiving unit 101 receives the image, the OCR processing unit 103 of the dialog server 10 performs OCR processing on the image and extracts character information. In step S105, the OCR processing unit 103 determines the status (initial status) of the device 40 from the extracted character information referring to the initial status definition table 300.

For example, when the message receiving unit 101 receives the image 1400 on the dialog screen G100 illustrated in FIG. 8, character information such as "paper", "misfeed", and the like is extracted by the OCR processing unit 103. Then, the OCR processing unit 103 refers to the initial status definition table 300 and identifies the keywords "paper" and "misfeed" included in the character information. As a result, the OCR processing unit 103 specifies the initial status "S1-1 (paper misfeed)" associated with the keywords "paper" and "misfeed".

On the other hand, when the message receiving unit 101 receives the failure state message, the message analyzing unit 104 of the dialog server 10 analyzes the failure state message and extracts character information representing the failure or the like occurring in the device 40. In step S106, the message analyzing unit 104 refers to the initial status definition table 300 and specifies the initial status of the device 40 from the extracted character information. Examples of the character information representing the failure or the like occurring in the device 40 include keywords such as "paper", "misfeed", "cut", "toner", "power supply", and "not activated". For example, when the failure state message is "paper misfeed", the message analyzing unit 104 extracts "paper" and "misfeed" as the character information. Note that, for example, an error code or the like may be extracted as character information representing the failure or the like occurring in the device 40.

Depending on the image or the failure state message received by the message receiving unit 101 of the dialog server 10, the OCR processing unit 103 or the message analyzing unit 104 may be unable to determine the initial status. This is because, for example, character information may not be extracted from the image (for example, when the image is unclear or when no character is included, etc.), or information representing the failure or the like occurring in the device 40 may not be included in the failure state message. In this case, the message transmitting unit 102 of the dialog server 10 may transmit a message requesting the user to transmit or input information describing the initial status again. In addition, for example, when the OCR processing unit 103 or the message analyzing unit 104 fails to determine the initial status after several attempts, the message transmitting unit 102 may transmit a list of types of failure or the like occurring in the device 40 (for example, "paper misfeed", "out of toner", "out of paper", etc.) for the user to select.

In step S107, the status update unit 106 of the dialog server 10 determines the initial status specified by the OCR processing unit 103 or the message analyzing unit 104 as the status of the device 40.

In step S108, referring to the message definition table 400, the message specifying unit 107 of the dialog server 10 specifies the message (recommended solution message) to be presented to the user based on the status of the device 40.

For example, when the initial status determined in the above-described step S107 is "S1-1 (paper misfeed)", the message specifying unit 107 refers to the message definition table 400 and specifies the recommended solution message "The paper seems to be misfed. Please open the side cover and remove the misfed paper".

Figure 9:
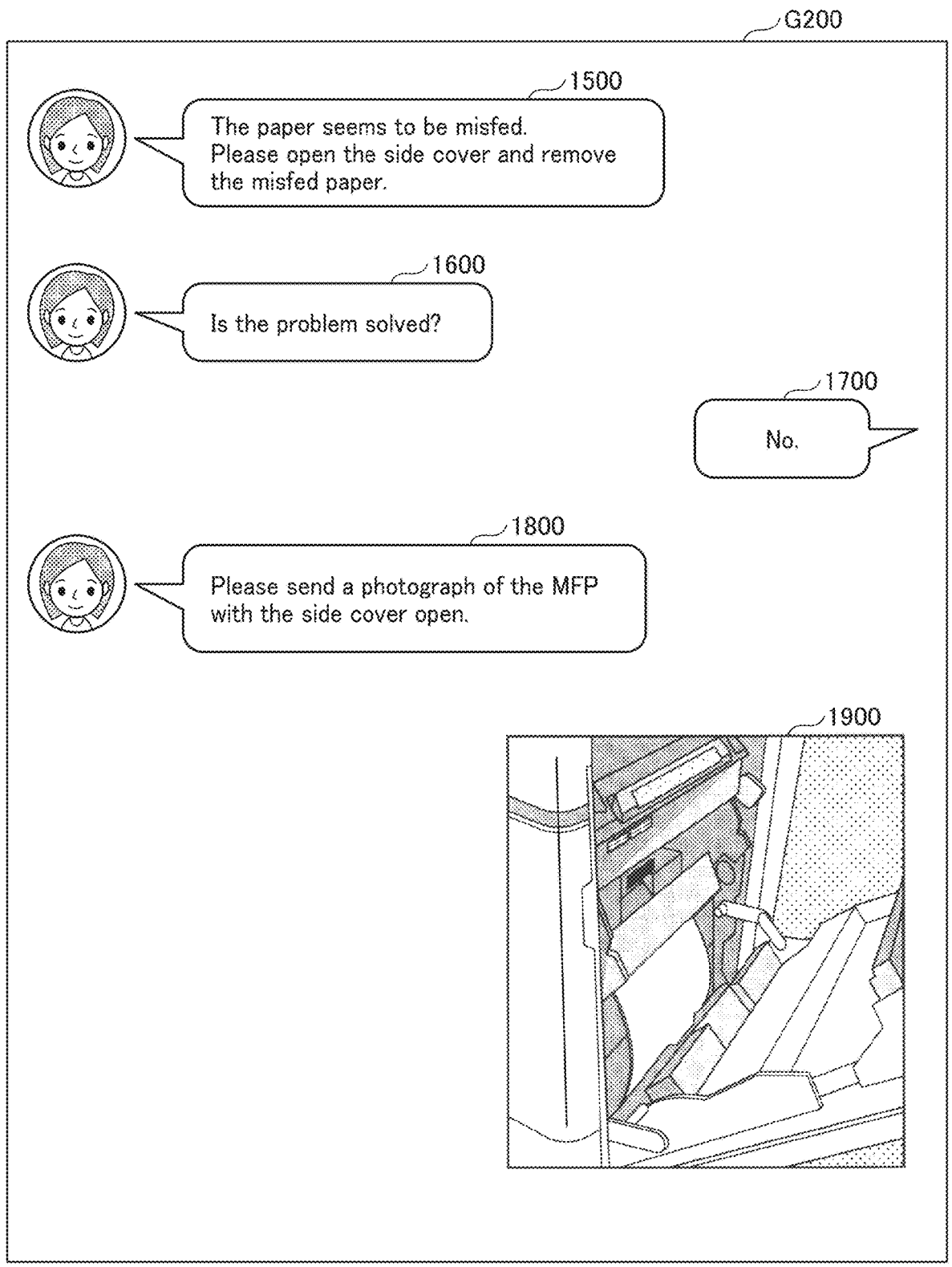
FIG. 9 is a diagram illustrating a second example of the dialog screen.

In step S109, the message transmitting unit 102 of the dialog server 10 transmits the recommended solution message specified in the above-described step S108 and another message asking the user whether the failure or the like has been solved to the terminal device 20. Thus, a message 1500 and a message 1600 are displayed on the dialog screen G200 by the messaging application 200 of the terminal device 20 as illustrated in FIG. 9. The message 1500 is the recommended solution message corresponding to the initial status "S1-1 (paper misfeed)" specified in the above step S108. The message 1600 is the message asking the user whether the failure or the like has been solved.

Note that the message transmitting unit 102 does not need to transmit the message 1500 and the message 1600 at the same time. For example, after transmitting the message 1500, the message 1600 may be transmitted after a lapse of several seconds to several minutes.

At this point, the user can attempt to solve the failure or the like occurring in the device 40 by referring to the message 1500 (recommended solution message) on the dialog screen G200 displayed by the messaging application 200.

If the user cannot solve the failure or the like occurring in the device 40 after referring to the message 1500, the user can use the messaging application 200 to input and transmit a message indicating that the failure or the like could not be solved by the operation indicated by the recommended solution message. When this input and transmission operation is performed, the messaging application 200 transmits a message indicating that the failure or the like could not be solved to the dialog server 10. As a result, a message 1700 indicating that the failure or the like could not be solved is displayed on the dialog screen G200 by the messaging application 200 of the terminal device 20.

On the other hand, if the user solves the failure or the like occurring in the device 40 referring to the message 1500 (recommended solution message), the user can then use the messaging application 200 to input and transmit the message indicating that the failure or the like has been solved by performing the operation indicated by the recommended solution message. When this input and transmission operation is performed, the messaging application 200 transmits the message indicating that the failure or the like is solved to the dialog server 10. As a result, a message (for example, "Yes.") indicating that the failure or the like is solved is displayed on the dialog screen G200 by the messaging application 200 of the terminal device 20.

A message other than the message indicating that the failure or the like is solved and the message indicating that the failure or the like is not solved may be transmitted to the dialog server 10. In this case, the message transmitting unit 102 of the dialog server 10 may transmit a message prompting re-input (retransmission), such as "Please re-transmit whether the problem has been solved or not." or the like.

In step S110, the message receiving unit 101 of the dialog server 10 determines whether the message indicating the solution of the failure or the like is received.

When the message indicating that the failure or the like is solved is received, the dialog server 10 executes the process of step S119 which are described later.

In step S111, upon receiving the message indicating that the failure or the like is not solved, the message specifying unit 107 of the dialog server 10 refers to the message definition table 400 and obtains a message to be presented to the user based on the status of the device 40 (requested action message).

For example, when the status of the device 40 is "S1-1 (paper misfeed)", the message specifying unit 107 refers to the message definition table 400 and specifies the requested action message "Please send a photograph of the MFP with the side cover open".

In step S112, the message transmitting unit 102 of the dialog server 10 transmits the message specified in the above step S111 to the terminal device 20. As a result, a message 1800 is displayed on the dialog screen G200 displayed by the messaging application 200 of the terminal device 20 as illustrated in FIG. 9. The message 1800 is the requested action message corresponding to the status "S1-1 (paper misfeed)" specified in the above step S111.

The user is informed of the part or the state of the device 40 to be photographed by the message 1800 (requested action message) on the dialog screen G200 displayed by the messaging application 200. The user takes a photograph of the device 40 at the part or in the state presented in the message 1800, for example, the MFP with the side cover open as illustrated in FIG. 9. Then, the user transmits an image generated by photographing the device 40 using the messaging application 200. As a result, on the dialog screen G200 displayed by the messaging application 200 of the terminal device 20, an image 1900 transmitted to the dialog server 10 is displayed.

In step S113, the message receiving unit 101 of the dialog server 10 receives the image from the terminal device 20.

In step S114, the image analyzing unit 105 of the dialog server 10 uses the image received by the message receiving unit 101 and the matching image stored in the matching image storage unit 108 to specify updated status of the device 40. The image analyzing unit 105 performs pattern matching between the received image and the matching image stored in the matching image storage unit 108, and determines the status associated with the most similar matching image to the corresponding device 40 as the updated status.

Note that the image analyzing unit 105 may not specify the status associated with the most similar matching image as the updated status. For example, the image analyzing unit 105 may specify the status having the highest rate of occurrence among the statuses respectively associated with the matching image whose similarity is equal to or greater than the predetermined threshold value as the updated status.

Hereinafter, the case where the status "S1-2 (misfed paper remaining)" is specified in the above step S114 is described.

In step S115, the status update unit 106 updates the status of the device 40 with the updated status specified by the image analyzing unit 105. As a result, the status of the device 40 is updated to the updated status "S1-2 (misfed paper remaining)".

In step S116, referring to the message definition table 400, the message specifying unit 107 of the dialog server 10 specifies a message (requested action message) to be presented to the user based on the status of the device 40.

For example, when the status of the device 40 is "S1-2 (misfed paper remaining)", the message specifying unit 107 refers to the message definition table 400 and displays the recommended solution message "Please remove the misfed paper while pressing the release switch".

Figure 10:
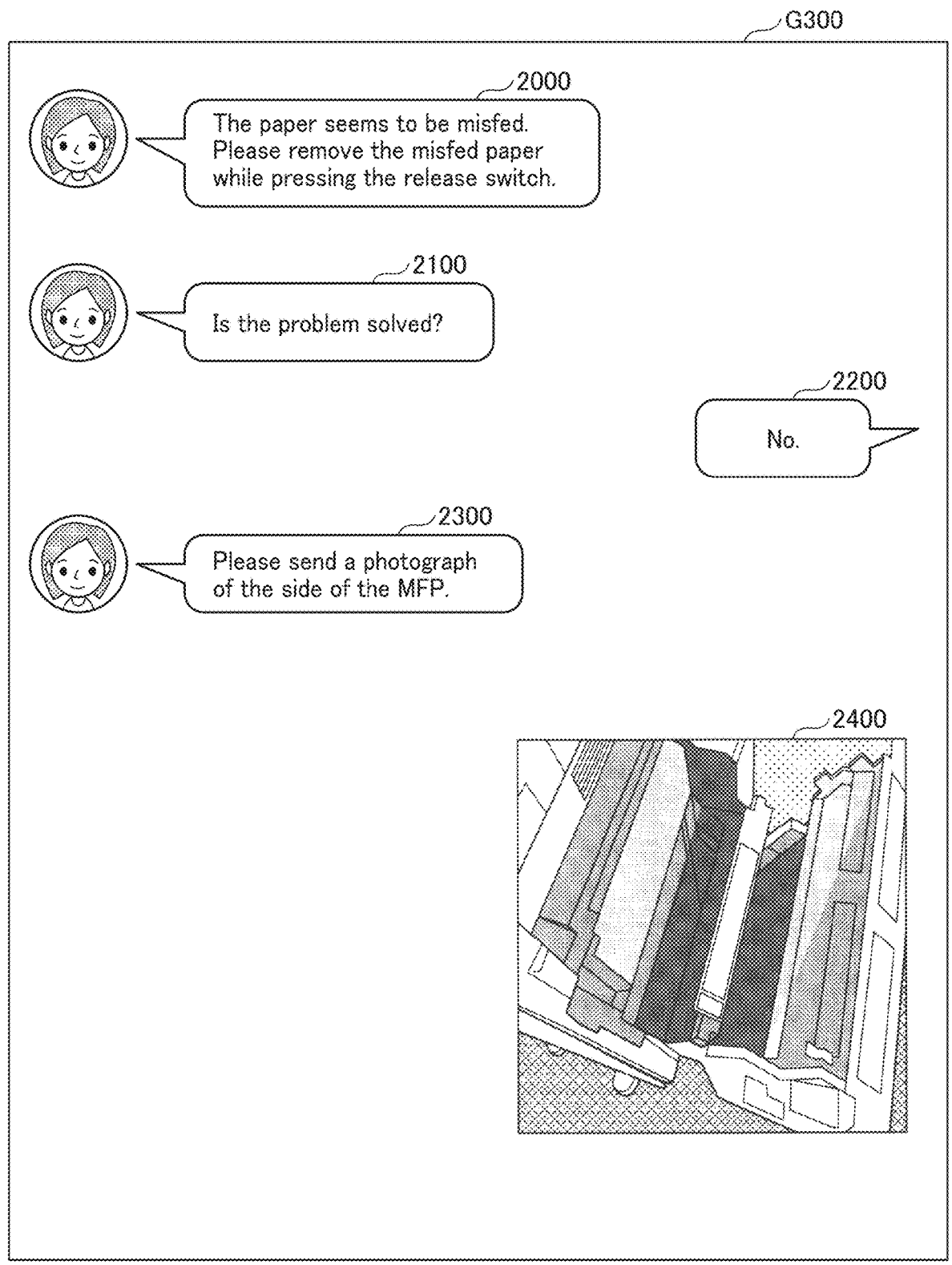
FIG. 10 is a diagram illustrating a third example of the dialog screen.

In step S117, the message transmitting unit 102 of the dialog server 10 transmits the recommended solution message specified in the step S116 and a message asking the user whether the failure or the like is solved to the terminal device 20. As a result, a message 2000 and a message 2100 are displayed on the dialog screen G300 as illustrated in FIG. 10 displayed by the messaging application 200 of the terminal device 20. The message 2000 is the recommended solution message for the status "S1-2 (misfed paper remaining)" specified in the above step S116. The message 2100 is the message asking the user whether the failure or the like is solved.

Note that the message transmitting unit 102 does not need to transmit the message 2000 and the message 2100 at the same time. For example, after transmitting the message 2000, the message 2100 may be transmitted after several seconds to several minutes.

At this point, the user can attempt to solve the failure or the like occurring in the device 40 by referring to the message 2000 (recommended solution message) on the dialog screen G300 displayed by the messaging application 200.

If the user cannot solve the failure or the like occurring in the device 40 after referring to the message 2000, the user can use the messaging application 200 to input and transmit a message indicating that the failure or the like could not be solved by the operation indicated by the recommended solution message. When this input and transmission operation is performed, the messaging application 200 transmits a message indicating that the failure or the like could not be solved to the dialog server 10. As a result, a message 2200 indicating that the failure or the like could not be solved is displayed on the dialog screen G300 by the messaging application 200 of the terminal device 20.

On the other hand, if the user solves the failure or the like occurring in the device 40 referring to the message 2000 (recommended solution message), the user can use the messaging application 200 to input and transmit a message indicating that the failure or the like has been solved by performing the operation indicated by the recommended solution message. When this input and transmission operation is performed, the messaging application 200 transmits the message indicating that the failure or the like is solved to the dialog server 10. As a result, a message (for example, "Yes.") indicating that the failure or the like is solved is displayed on the dialog screen G200 by the messaging application 200 of the terminal device 20.

In step S118, the message receiving unit 101 of the dialog server 10 determines whether the message indicating that the failure or the like has been solved is received.

Upon receiving the message indicating that the failure or the like could not be solved, the dialog server 10 returns the process to step S111. As a result, the above-described steps S111 to S118 are repeated until the failure or the like is solved. For example, in the dialog screen G300 illustrated in FIG. 10, a message (requested action message) 2300 indicating "Please send a photograph of the side of the MFP." and an image 2400 of the MFP (device 40) taken by the user are displayed.

Further, a message (recommended solution message) 2500 "The cover is not yet closed. Please close the cover while pressing the release switch." is displayed on the dialog screen G400 following the image 2400 as illustrated as an example in FIG. 11. The recommended solution message 2500 is corresponding to the status specified from the image 2400 which is indicating that the cover is open. Thus, if the problem (for example, the paper misfeed) has been solved, but another problem (for example, the cover is open) occurs, a solution to this further problem is presented.

In step S119, the message transmitting unit 102 of the dialog server 10 transmits a completion message to the terminal device 20, when the message indicating that the failure or the like has been solved is received. As a result, a message 2600 (completion message) is displayed on the dialog screen G400 by the messaging application 200 as illustrated in FIG. 11.

In step S120, the status update unit 106 of the dialog server 10 updates the status of the device 40 to the status, for example, "S1-9 (solved)" indicating that the failure or the like occurring in the device 40 has been solved. Thereby, for example, the status of the device 40 is updated to "S1-9 (solved)".

Figure 11:
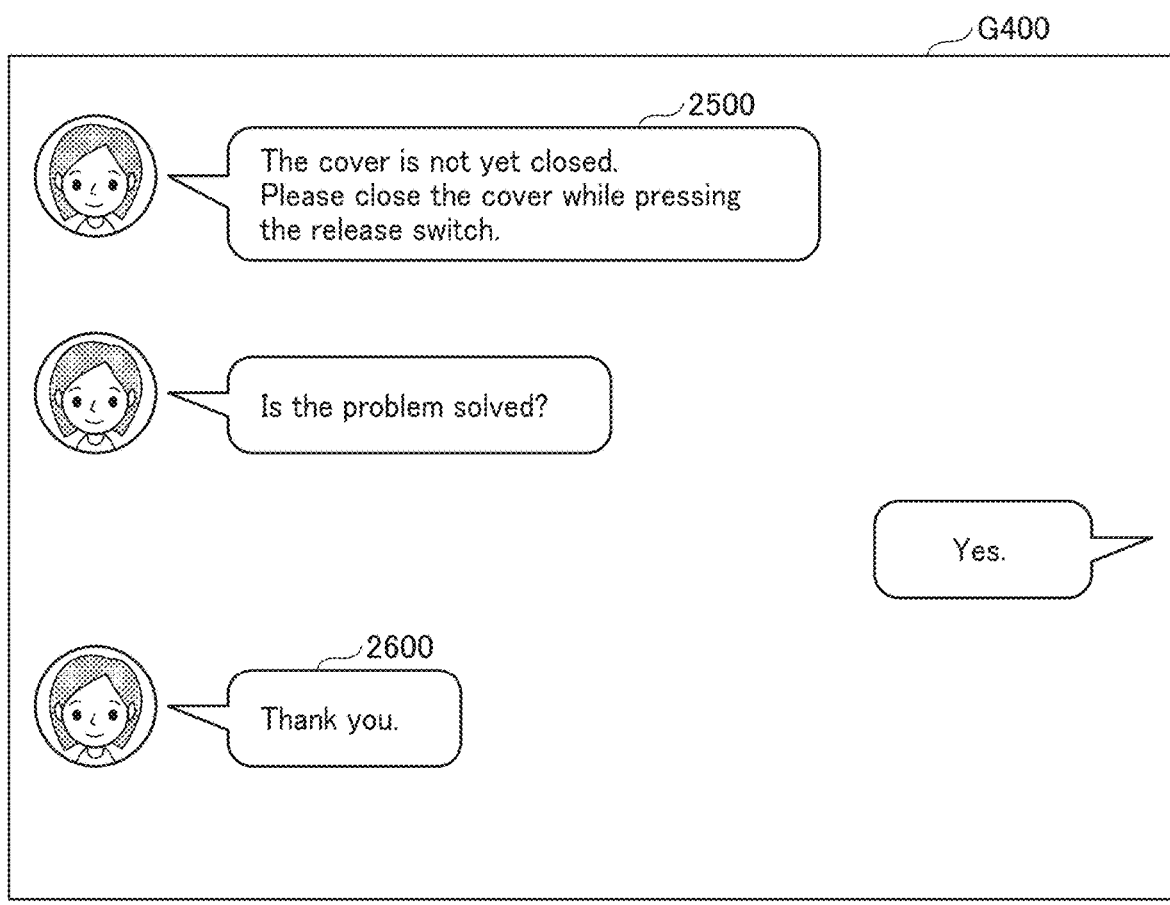
FIG. 11 is a diagram illustrating a fourth example of the dialog screen.
Figure 12:
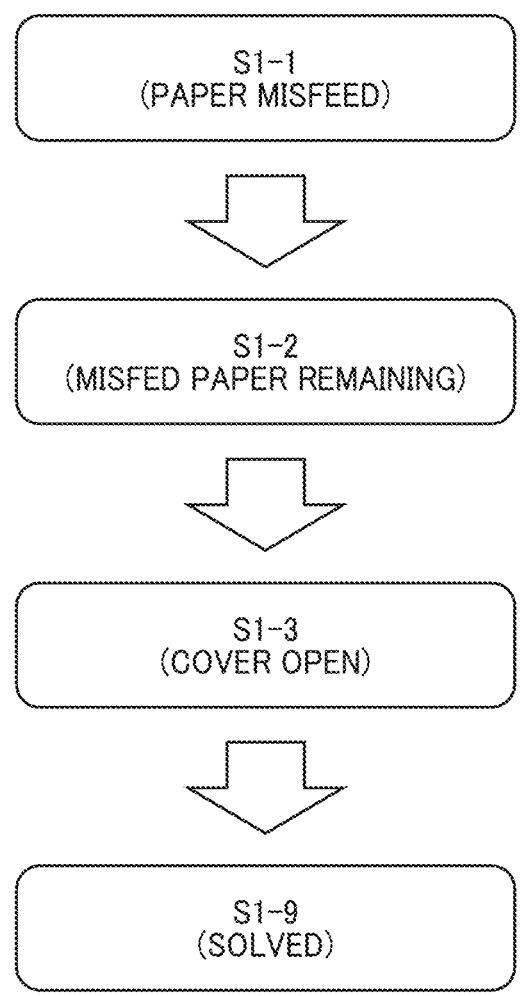
FIG. 12 is a diagram illustrating an example of status transition.

The status transition of the device 40 from the dialog screen G100 illustrated in FIG. 8 to the dialog screen G400 illustrated in FIG. 11 is as illustrated as an example in FIG. 12. As illustrated in FIG. 12, from the dialog screen G100 illustrated in FIG. 8 to the dialog screen G400 illustrated in FIG. 11, the order of status transition of the device 40 is "S1-1 (paper misfeed)", "S1-2 (misfed paper remaining), "S1-3 (cover open)", and "S1-9 (solved)".

As described above, the dialog server 10 according to the present embodiment determines the status of the device 40 based on the image transmitted from the terminal device 20 and presents the solution appropriate to the specified status. In addition, when the failure or the like cannot be resolved by the solution at the certain status, the dialog server 10 according to the present embodiment requests the user to take a photograph and send the photograph of the specified part or the specified state of the device 40. Then, the dialog server 10 according to the present embodiment specifies the updated status of the device 40 from the image received from the user and presents another solution appropriate to the updated status of the device 40. In this way, the dialog server 10 according to the present embodiment transitions the status of the device 40 from the image received from the user and presents the solution appropriate to the status of the device 40 to the user.

Thus, for example, without inputting information (for example, model name, serial number, error code, etc. of the device 40), the user can receive presentation of the solution appropriate to the status of the device 40. Therefore, by using the dialog server 10 of the present embodiment, it is possible to prevent an erroneous solution from being presented due to an erroneous input by the user and present a solution appropriate to the status specified from the image of the device 40.

The dialog server 10 according to the present embodiment is not limited to presenting the solution for the failure occurring in the device 40. The dialog server 10 according to the present embodiment can be applied to various bot services that present prescribed information according to the status specified from the image transmitted by the user while interacting with the user.

Further, in the present embodiment, the dialog between the user and the bot is not limited to messages in character as described above. All or part of the message in the dialog between the user and the bot may be voice or the like. Further, for example, video image or the like may be used to indicate the part or the state of the device 40 in reply to the requested action message. Furthermore, the dialog server 10 according to the present embodiment may specify the updated status of the device 40 from, for example, the video image.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Moreover, any one of the above-described operations may be performed in various other ways, for example, in an order different from the one described above.

Any one of the above-described operations may be performed in various other ways, for example, in an order different from the one described above.

What is claimed is:

1. An information processing method, performed by a computer connectable to a terminal via a network, the method comprising:
   extracting character information from a first image received from the terminal using optical character recognition;
   determining a status of a device based on an association between a predetermined status and a keyword included in the character information;
   determining a solution for a failure occurring in the device based on the status of the device; and
   causing a message to be displayed on the terminal indicating the solution.

2. The information processing method of claim 1, wherein the extracting character information extracts the character information from a second image displayed on the device, the second image being included in the first image.

3. The information processing method of claim 1, wherein the extracting character information extracts the character information from a second image displayed on the device, the second image having been photographed by the terminal.

4. The information processing method of claim 1, further comprising:
   causing a message to be displayed on the terminal requesting retransmission of the first image based on a failure to determine the status of the device using the character information.

5. The information processing method of claim 1, wherein the determining a solution includes referring to an association between the status of the device and the solution.

6. An information processing apparatus comprising:
   a communication interface configured to connect to a terminal;
   a memory storing a plurality of instructions; and
   a processor configured to execute the plurality of instructions to:
      extract character information from a first image received from the terminal using optical character recognition,
      determine a status of a device based on an association between a predetermined status and a keyword included in the character information,
      determine a solution for a failure occurring in the device based on the status of the device, and
      cause a message to be displayed on the terminal indicating the solution.

7. The information processing apparatus of claim 6, wherein the processor is configured to execute the plurality of instructions to:
   extract the character information from a second image displayed on the device, the second image being included in the first image.

8. The information processing apparatus of claim 6, wherein the processor is configured to execute the plurality of instructions to:
   extract the character information from a second image displayed on the device, the second image having been photographed by the terminal.

9. The information processing apparatus of claim 6, wherein the processor is configured to execute the plurality of instructions to:
   cause a message to be displayed on the terminal requesting retransmission of the first image based on a failure to determine the status of the device using the character information.

10. The information processing apparatus of claim 6, wherein the processor is configured to execute the plurality of instructions to:
    determine the solution by referring to an association between the status of the device and the solution.

11. An information processing system comprising:
    an information processing apparatus; and
    a terminal communicably connected to the information processing apparatus,
    the information processing apparatus including
       a first memory storing a first plurality of instructions, and
       a first processor configured to execute the first plurality of instructions to
          extract character information from a first image using optical character recognition,
          determine a status of a device based on an association between a predetermined status and a keyword included in the character information,
          determine a solution for a failure occurring in the device based on the status of the device, and
          transmit a message to the terminal indicating the solution, and
    the terminal including
       a second memory storing a second plurality of instructions, and
       a second processor configured to execute the second plurality of instructions to
          transmit the first image to the information processing apparatus, and
          display on a display the message indicating the solution.

12. The information processing system of claim 11, wherein the first processor is configured to execute the first plurality of instructions to:
    extract the character information from a second image displayed on the device, the second image being included in the first image.

13. The information processing system of claim 11, wherein
    the first processor is configured to execute the first plurality of instructions to extract the character information from a second image displayed on the device; and
    the second processor is configured to execute the second plurality of instructions to photograph the second image.

14. The information processing system of claim 11, wherein
    the first processor is configured to execute the first plurality of instructions to transmit a message to the terminal requesting retransmission of the first image based on a failure to determine the status of the device using the character information; and
    the second processor is configured to execute the second plurality of instructions to display on the display the message requesting retransmission of the first image.

15. The information processing system of claim 11, wherein the first processor is configured to execute the first plurality of instructions to:

determine the solution by referring to an association between the status of the device and the solution.

\* \* \* \* \*